July 19, 1960 H. DORENDORF 2,945,286
DIFFUSION TRANSISTOR AND METHOD OF MAKING IT
Filed July 10, 1957
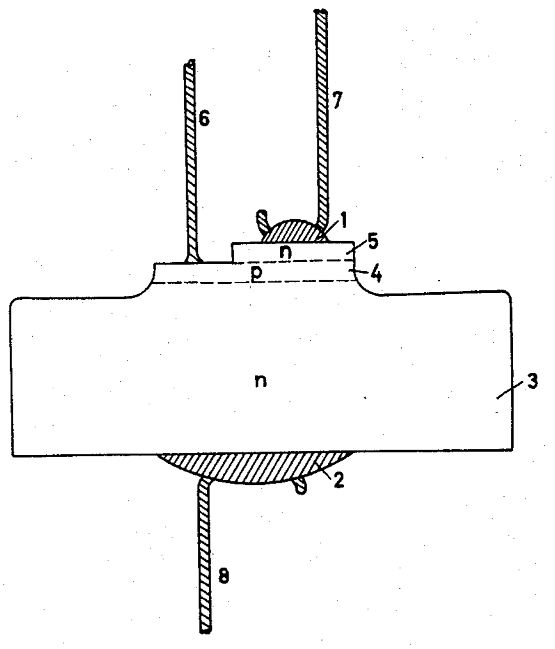
Inventor:
Heinz Dorendorf
By. Atty.

United States Patent Office 2,945,286

Patented July 19, 1960

2,945,286

DIFFUSION TRANSISTOR AND METHOD OF MAKING IT

Heinz Dorendorf, Munich, Germany, assignor to Siemens and Halske Aktiengesellschaft Berlin and Munich, a corporation of Germany Filed July 10, 1957, Ser. No. 671,062

Claims priority, application Germany July 23, 1956

1 Claim. (Cl. 29—25.3)

This invention relates to transistors and is particularly concerned with a diffusion transistor and a method of making it.

In diffusion transistors, some zones of differing conduction type are generally formed very thin. In accordance with known methods, these zones are preferably produced by diffusion of donators and acceptors from a gaseous phase.

N-p-n transistors, made preferably of silicon, have been proposed especially for operating at high frequencies, the contacting of the p-conducting base being effected through the emitter by means of an aluminum wire which does not act in a blocking sense, or only slightly in a blocking sense, relative to the n-conducting emitter layer arranged thereabove and perforated thereby. This mode of operation is applied, for example, in using silicon as a semiconductor, aluminum and antimony acting as majority carriers. A corresponding semiconductor arrangement may for example be used up to a frequency of 100 megacycles. In case germanium is used as a semiconductor material, a known arrangement will be found advantageous, comprising a p-conducting germanium basic crystal carrying an n-layer produced thereon by diffusion and contacted by a relatively wide gold-antimony electrode. Immediately adjacent thereto there is a layer of aluminum vaporized on the crystal, such layer acting as a p-layer.

It has also been proposed to provide for contacting in the case of high frequency transistors having a very thin base zone, to cut the semiconductor crystal forming an n-p-n layer, at a small angle to the plane of the layer limit, thereby producing a relatively wide cutting surface along the base. It is, however, generally quite difficult to find exactly the limits containing the p-layer to be contacted and to provide the corresponding area with a contact.

The object of the invention is to effect the contacting of the base in a diffusion transistor in simple manner, without having to carry the electrode through a zone of other conduction type in order ot obtain satisfactory blocking characteristics.

This object is according to the invention realized, in connection with a semiconductor crystal having, as compared with the third zone, very thin first and second zones, by making the linear dimensions of each zone, in the direction of their planes, from zone to zone stepwise larger, thereby obtaining free surface portions, and by wholly or partially contacting the free surface portion of at least the second zone.

The material of the semiconductor arrangement may be germanium, silicon, or an $A_{III}$-$B_{IV}$-combination.

A semiconductor according to the invention exhibits a stepped configuration, each step being formed by a zone of different conduction type. Adjacent a relatively thick, extended n-region of the base crystal, there is provided a thin and less extensive p-zone and on the latter is disposed a still smaller n-zone. The thick n-zone as well as the thin n-zone are upon their free surfaces provided with a solder, for example, tin, for low resistance contacting of the electrode terminals.

Further details of the invention will appear from the description of an embodiment which is rendered below with reference to the accompanying drawing.

The drawing shows in the lower part a relatively thick n-layer 3, formed, for example, by an n-germanium semiconductor crystal, serving as collector. On top of this crystal is disposed a p-layer 4, serving as a base, carrying in turn a smaller n-layer 5 which operates as emitter. To the base 4 is alloyed a wire 6 which may advantageously consist of gold containing about 1% gallium. The emitter layer 5 is contacted with a suitable solder, for example, tin 1, which is connected with a suitable wire 7, for example, a copper wire. The thick n-layer 3 may be similarly provided with solder 2 for connecting a copper wire 8.

The method of producing a transistor according to the invention may be practiced, for example, as follows:

Along the surface of an n-conductive germanium crystal is produced, for example, by diffusion from a gaseous phase, a p-layer, and upon the latter a further n-diffusion layer. The top n-layer receives a solder point with a diameter, for example, of 0.3 mm. The solder point and a small surrounding area are masked by suitable means and the remaining surface of the crystal is etched. The etching may be carried on, for example, for intervals of five seconds, until the n-layer along the unmasked surface is completely removed. The proper instant for the termination of the etching may be determined by testing the thermal voltage occurring between a hot point set in contact with the crystal surface, and a support for the lower n-layer.

After the top n-layer outside the masked area is etched off, a wider surrounding area is provided with an acid-proof mask, and the etching is repeated to remove in this manner the undesired portion of the p-layer serving as the base.

As indicated before, the gold wire alloyed with gallium, is thereafter contacted with the exposed p-layer, preferably alloyed thereto and the solder points, provided upon the two outer n-layers as described, are connected with electrodes.

It has been assumed that the zones in an arrangement according to the invention are zones of specific conduction type; it being understood however, that these zones may be of different conduction type and/or different in purity content, and the term "conduction type" is accordingly intended to embrace both conditions.

Transistors according to the invention may be produced in simple manner because the base can be contacted easily, and are especially suitable for operation at high frequencies. Furthermore, very low blocking current will flow between the base and the emitter, resulting in a particularly favorable curve of the blocking characteristic which is above all important in the use of the transistor as a switch.

Transistors according to the invention may be used up to a limit frequency of about 20 megacycles.

Changes may be made within the scope and spirit of the appended claims.

I claim:

A method of producing a semiconductor arrangement having at least three zones of different conduction type, wherein two mutually adjacent zones are relatively very thin as compared with the third zone, and wherein the areas occupied by said zones increase stepwise from zone to zone in the direction of said third zone, said method comprising, forming upon a relatively thick semiconductor crystal forming said third zone two relatively thin layers forming zones of different conduction type, placing solder upon the topmost relatively thin layer and masking said solder and an area immediately adjacent thereto, etching away the corresponding top layer extending laterally outside said masked area to expose the intermediate relatively thin layer disposed under such top layer, masking a portion of said intermediate layer, etching away the unmasked portion of said intermediate layer to expose the surface of the relatively thick crystal layer disposed thereunder and continuing said last named etching step to remove a portion of the material of said crystal so as to reset the corresponding crystal surface with respect to said intermediate layer, each of said etching steps being applied intermittently in intervals of about five seconds duration, controlling the amount of layer material etched off in each etching step by testing thermally dependent voltage connected to said crystal, alloying to said intermediate layer at least one electrode made of gold containing a relatively small amount of gallium, placing solder upon the free surface of said crystal which faces away from said relatively thin mutually adjacent zones, and connecting a copper wire with the solder respectively placed upon said top layer and upon the free surface of said crystal.

References Cited in the file of this patent

UNITED STATES PATENTS

| | | |
|---|---|---|
| 2,666,814 | Shockley | Jan. 19, 1954 |
| 2,813,233 | Shockley | Nov. 12, 1957 |
| 2,817,798 | Jenny | Dec. 24, 1957 |
| 2,821,493 | Carman | Jan. 28, 1958 |
| 2,829,075 | Pankove | Apr. 1, 1958 |
| 2,848,665 | Little | Aug. 19, 1958 |